Figure 1:
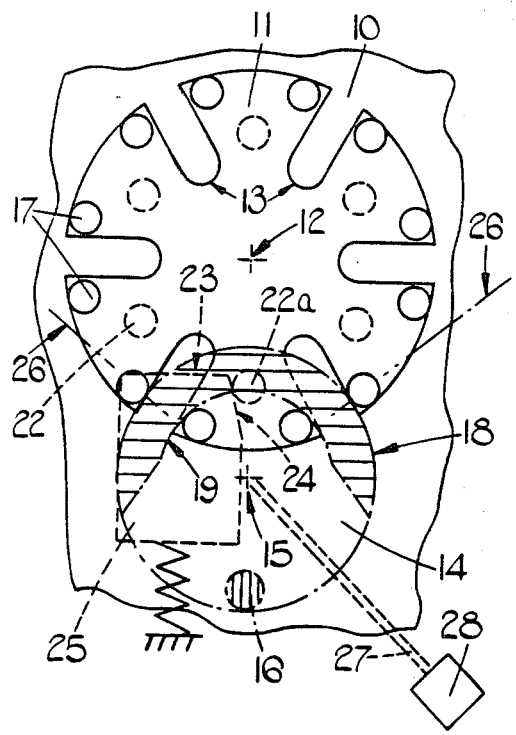

United States Patent [19]  [11] 4,317,385
Harvey et al.  [45] Mar. 2, 1982

[54] GENEVA MECHANISM

[75] Inventors: Charles J. Harvey, Kings Coughton; Christopher G. Wright, Redditch, both of England

[73] Assignee: Advance Automation Assembly Limited, Redditch, England

[21] Appl. No.: 131,752

[22] Filed: Mar. 19, 1980

[30] Foreign Application Priority Data

Apr. 11, 1979 [GB] United Kingdom ............... 12798/79

[51] Int. Cl.³ ............................................. F16H 55/00
[52] U.S. Cl. ......................................... 74/436; 74/820
[58] Field of Search ................................. 74/820, 436

[56] References Cited

U.S. PATENT DOCUMENTS

| 2,597,950 | 5/1952 | Robertson | 74/436 |
| 2,625,833 | 1/1953 | Johnson | 74/436 |
| 3,443,455 | 5/1969 | Zugel | 74/820 |
| 3,605,517 | 9/1971 | Seragnoli | 74/436 |

FOREIGN PATENT DOCUMENTS

| 93236 | 9/1896 | Fed. Rep. of Germany | 74/436 |
| 61752 | 7/1912 | Switzerland | 74/436 |

Primary Examiner—Kenneth Dorner
Attorney, Agent, or Firm—Trexler, Bushnell & Wolters, Ltd.

[57] ABSTRACT

A geneva mechanism has a slotted geneva wheel and a driving cam wheel engageable with the geneva wheel to impart stepwise rotation thereto. The geneva wheel carries rollers, two of which are simultaneously engageable by a first part-cylindrical surface on the cam wheel to lock the geneva wheel against rotation. This simultaneous engagement imparts a slight resilient stress to the parts and thereby prevents backlash movement during the locked condition. Additionally a second, parallel part-cylindrical surface on the cam wheel co-operates with the first such surface and with two of the geneva wheel rollers to maintain the geneva wheel under control of the cam wheel as the latter starts and ends its driving engagement.

10 Claims, 12 Drawing Figures

GENEVA MECHANISM

This invention relates to rotary indexing mechanism of the type which includes a fixed structure, a driven wheel mounted on said structure for rotation about a first axis and provided with a plurality of equiangularly spaced radial slots, a cranked driving member mounted on said structure for rotation about a second axis, said member being successively engageable with said slots to impart intermittent rotation to said driven wheel, and first and second interengageable detent devices respectively rotatable with said driven wheel and said driving member, for restraining said driven wheel against rotation when said driving member is not engaged with any slot.

Such a mechanism is commonly referred to as a geneva mechanism, and the driven wheel as a geneva wheel.

In geneva mechanisms there is normally some clearance between the detent devices when in their interengaged condition, and some movement of the driven geneva wheel remains possible even in the condition in which it is ostensibly locked. When such mechanisms are applied to machine tools, and are used, for example, to establish relative locations of a tool and a workpiece it is desirable that the geneva wheel shall be positively located and prevented from rotating over the major part of rotation of the driving member. It is known to attempt to overcome this difficulty by providing a spring loaded profiled bolt which co-operates with the geneva wheel in its ostensibly locked condition. In order to obtain satisfactory retention of the driven wheel against movement during an operation which is being carried out on a workpiece whose relative location is established as aforesaid, it has proved necessary to provide the bolt with a heavy spring loading. Such bolts are therefore liable to experience considerable wear in use, and such wear gives rise to increasing backlash movement between the geneva wheel and drive element.

It is also a disadvantage of known geneva mechanisms that a period can exist between disengagement of the detent devices and the engagement of the driving member in a slot of the geneva wheel, in which period the geneva wheel is free to rotate in at least one direction.

It is an object of the present invention to provide a geneva mechanism of the aforesaid type in which the foregoing disadvantages are substantially overcome.

According to the invention there is provided a geneva mechanism having a relatively fixed structure, a geneva wheel mounted on said structure for rotation about a first axis, a driving member mounted on said structure for rotation about a second axis and being drivingly engageable with said geneva wheel to impart stepwise rotation thereto, and first and second detent means respectively rotatable with said geneva wheel and said driving member, said first detent means comprising a plurality of first abutment surfaces arranged on a pitch circle about the axis of rotation of said first detent means, and said second detent means comprising a first part-cylindrical surface which in a first relative position of said first and second detent means simultaneously engages two of said first abutment surfaces to prevent rotation of said first detent device and said geneva wheel.

The embodiments of the invention will now be described by way of example only and with reference to the accompanying drawings in which:

FIGS. 1 to 4 show, diagrammatically, sequential operating steps of a first embodiment of the mechanism, FIGS. 5 to 8 show, diagrammatically, sequential operating steps of a second embodiment, and FIGS. 9 to 12 show, diagrammatically, sequential operating steps of a third embodiment.

As shown in FIG. 1 a fixed base or frame, indicated at 10, has a slotted geneva wheel 11 mounted thereon for rotation about an axis 12 by a shaft 27 which is acted on by a suitable drive control 28. In the present example the geneva wheel 11 is provided with six equi-angularly spaced slots 13, but in other embodiments a greater number of slots may be provided. A cam wheel 14 is mounted on the base 10 for rotation about an axis 15 which is in spaced parallel relationship with the axis 12. The cam wheel 14 supports a roller 16 which is adapted to enter each of the slots 13 with a slight clearance, the axis of the roller 16 being spaced from the axis 15. In the diagrammatic arrangement shown the cam wheel 14 partly overlies the geneva wheel 11, and the roller 16 projects downwardly to engage the slots 13.

A plurality of rollers 17 are supported on the geneva wheel 11 adjacent its circumference and are arranged in pairs the rollers 17 in each pair being on respective sides of the slots 13. The rollers 17 provide abutment faces which co-operate with abutment surfaces on the cam wheel 14. The abutment surfaces on the cam wheel 14 are provided by first and second part-cylindrical surfaces 18, 19, the surfaces 18, 19 being coaxial with the axis 15. The radius of the surface 18 is such that when the relative positions of the wheels 11, 14 are as shown in FIG. 1, the surface 18 simultaneously engages the outer most rollers of two adjacent pairs thereof. Moreover the mountings of the wheels 11, 14 on the base 10 is such that a slight stress is applied to the engaged rollers 17, and thence through their mountings on the wheel 11 to the bearings of the respective axes 12, 15. This stress is designed to be such that the elastic limits of the various parts to which it is applied are not exceeded. The stress nevertheless has the effect that, in the positions shown in FIG. 1, the wheel 11 is positively held against rotation. The radius of the surface 18 and the pitch circle on which the rollers are located are such that the lines of action 26 of the reaction forces between the surface 18 and the rollers 17, in the condition shown in FIG. 1, pass through the axis 15, so that these lines of action are normal to the surface 18 and location and locking of the geneva wheel 11 is thereby rendered most effective. The radial spacing between the surfaces 18, 19 is such that they can pass with slight clearance between the rollers of adjacent pairs.

Figure 2:
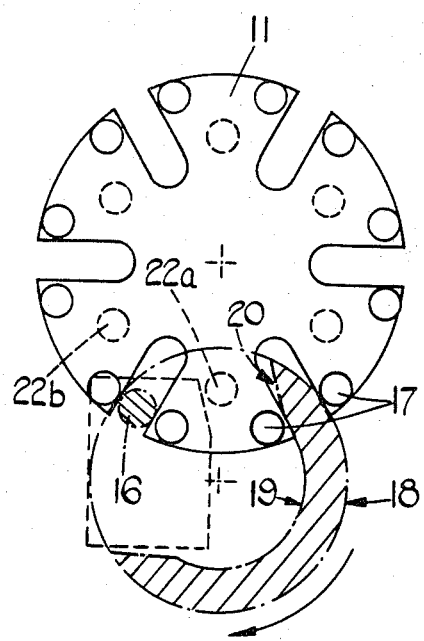

Rotation of the cam plate 14 clockwise from the position shown in FIG. 1 causes the surface 18 to move clear of one of its previously-engaged rollers 17, before the roller 14 enters a slot 13. In this condition rotation of the wheel 11 is limited to that permitted by the clearance of the surfaces 18, 19 between the rollers of a pair associated with a slot 13 which is adjacent a slot which the roller 16 is about to engage. This condition is shown in FIG. 2 and obtains until the roller 16 has entered its slot 13, whereupon a relieved surface 20 between the surfaces 18, 19 allows the wheel 11 to start an anticlockwise indexing step. The roller 16 initially enters a slot 13 in a radial direction of the geneva wheel 11, and thus initially imparts effectively no rotation to the wheel 11.

The surfaces 18, 19 may thus extend so as to restrain the wheel 11 against significant rotation until the roller 16 is fully engaged in a slot 13. The wheel 11 thus remains under control of the driving wheel 14 during this stage of operation of the mechanism.

Figure 3:
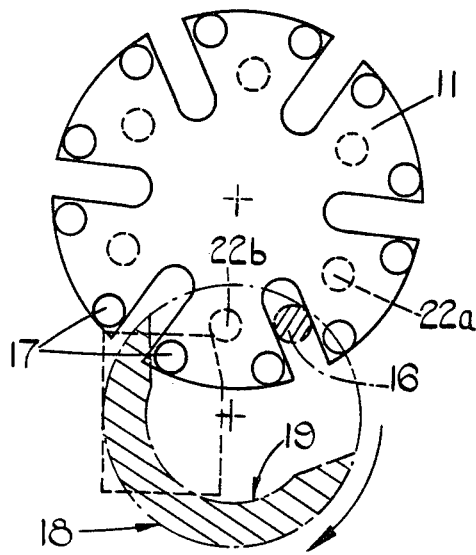
Figure 4:
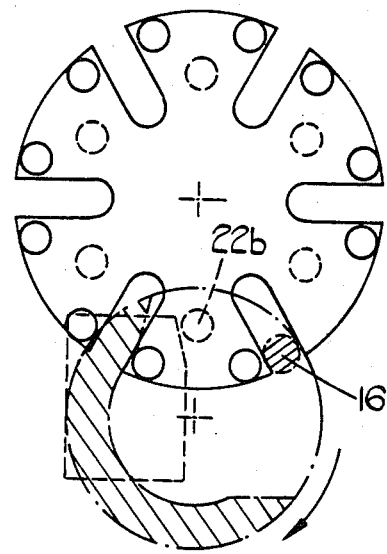
Figure 5:
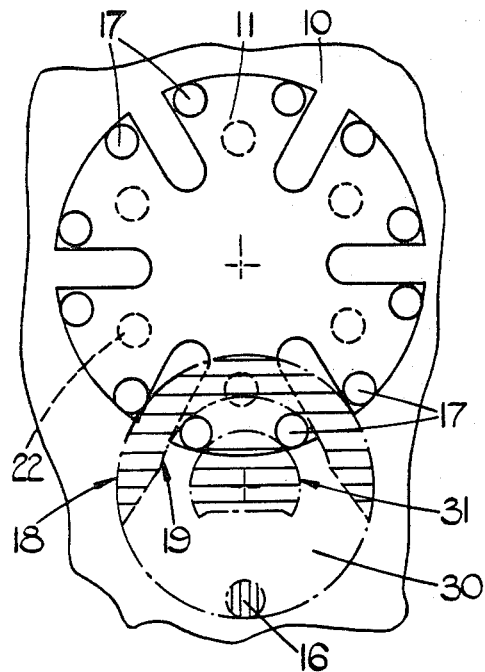
Figure 6:
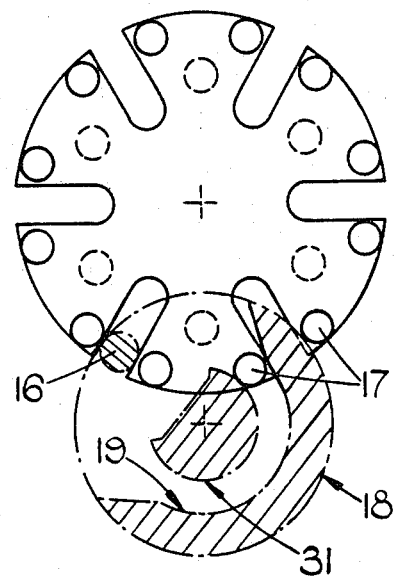
Figure 7:
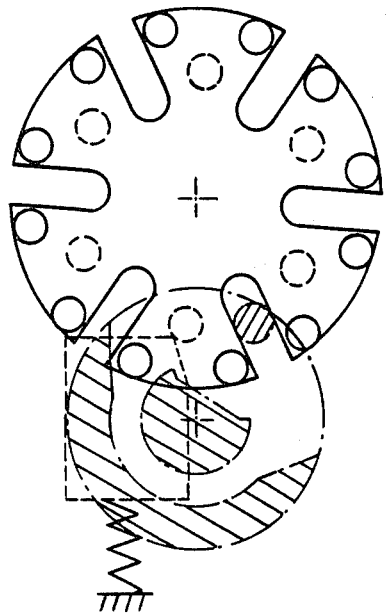
Figure 8:
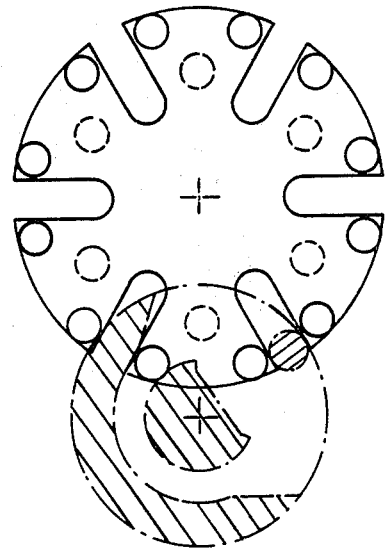
Figure 9:
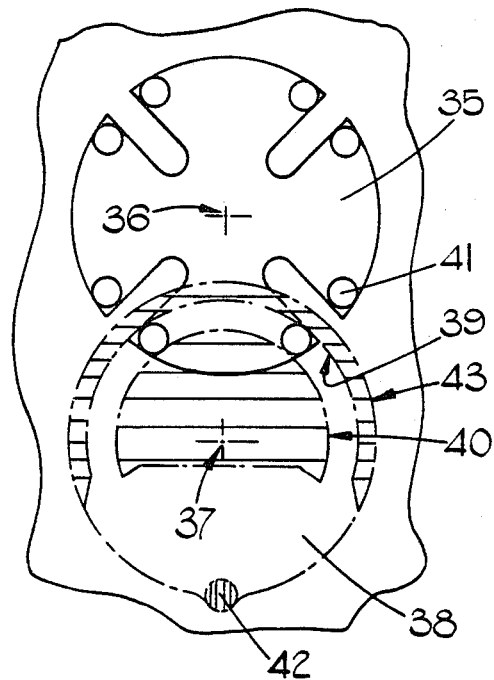
Figure 10:
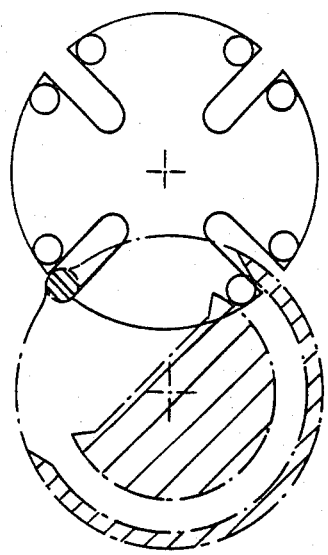
Figure 11:
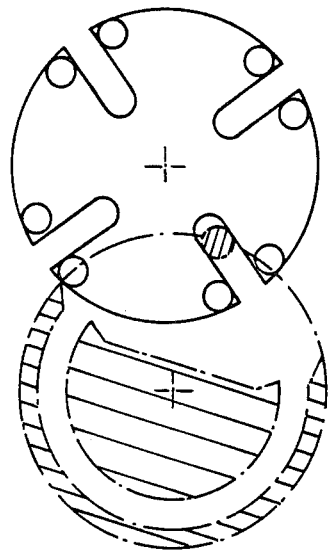
Figure 12:
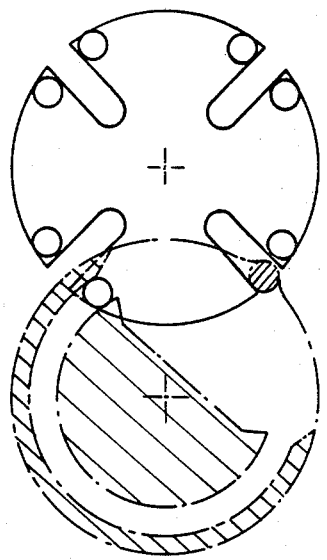

FIG. 3 shows the condition as the wheel 11 approaches the end of an indexing step, and with the roller 16 still engaging a slot 13. The surfaces 18, 19 are about to enter the space between a pair of rollers 17 associated with a slot 13 adjacent that engaged by the roller 16. FIG. 4 shows the condition in which the surfaces 18, 19 have passed between the rollers of a pair, this condition obtaining before the roller 16 leaves its engaged slot 13, and the wheel 11 is thus fully under control of the wheel 14 during this stage of operation. Movement of the wheel 11 is thus, once again, limited to that permitted by clearance of the surfaces 18, 19 between adjacent rollers. The cam wheel 14 continues to rotate until the condition shown in FIG. 1 is once again reached.

The geneva wheel 11 thus remains under control at all times, even when the roller 16 is entering and leaving the slots 13. Moreover, there is a positive sprung engagement between the wheels 11, 14 in the condition shown in FIG. 1.

When an indexing mechanism of the foregoing type is used for repetitive machining or other operations it is convenient to arrange that at the end of each step of the geneva wheel 11 the drive wheel 14 is brought to rest in the locking position shown in FIG. 1. As a result wear of the surface 18 may occur at locations thereon engaged by the rollers 17 in the locking position. When this wear exceeds the slight sprung movement between the rollers 17 and surface 18, backlash may occur. This backlash may readily be removed by slight adjustment of the rotational position of the wheel 14 relative to the control 28 whereby start and finish position of the wheel 14 at each step is altered. Such adjustment will not affect the stepwise rotation of the geneva wheel 11.

On the under-side of the geneva wheel 11 are a plurality of equi-spaced rollers 22, the number of the rollers 22 being equal to that of the slots 13. The rollers 22 are sequentially engageable by surfaces 23, 24 on a spring-biased sliding bolt 25 mounted on the base 10. In the position shown in FIG. 1 the surface 24 engages one of the rollers 22a, in such a way as to urge the wheel 11 in an anticlockwise direction, this movement being, of course, prevented by engagement of the surface 18 with two of the rollers 17. In the position shown in FIG. 2 the surface 24 continues to urge the wheel 11 anticlockwise, so that one of the rollers 17 is urged into abutment with the surface 19. As the wheel 11 approaches the mid point of its anticlockwise indexing step, the next adjacent roller 22b engages the surface 23 of the bolt 25 urging the latter against its spring. This engagement applies a clockwise bias, and hence a decelerating torque, to the wheel 11. In the position shown in FIG. 3 the roller 22b clears the junction of the surfaces 23, 24 allowing the bolt 25 to slide forward and thereafter to apply an anticlockwise torque to the wheel 11.

Since the belt 25 is not required to restrain the wheel 11 against rotation in its locked condition, the spring bias applied to the bolt 25 may be relatively light. Wear on the faces of the bolt 25 is thus small, and will not affect operation of the mechanism.

The embodiment shown in FIGS. 5 to 8 also includes a base 10 and a six-slot geneva wheel 11 provided with roller pairs 17 and with additional rollers 22, as before. A cam plate 30 has outer and inner coaxial cylindrical surfaces 18, 19, as in the first embodiment, but has in addition a third cylindrical surface 31, coaxial with the surfaces 18, 19 and spaced from the surface 19 by a distance slightly greater than that of the diameters of the rollers 17. In a particular form of this second embodiment the radius of the surface 18 is such that in the condition shown in FIG. 5 the surface 18 is in stressed engagement with two of the rollers 17 to lock the wheel 11 in position. Rotation of the cam plate 30 and its associated drive roller 16 to the position shown in FIG. 6 the surface 18 no longer engages two of the rollers 17, and rotation of the wheel 11 is limited to that permitted by clearance of the surfaces 18, 19 between the rollers of a pair, and also by the location of one of those rollers between the surfaces 19, 31. As the cam wheel 30 rotates clockwise from the position shown in FIG. 6 the rollers 17 are released from their location by the surfaces 18, 19, 31 and the wheel 11 is indexed by an anticlockwise step, through the positions shown in FIGS. 7 and 8 in which a next adjacent pair of rollers 17 is located by the surfaces 18, 19, 31. The bolt 25 acts on the rollers 22 in the manner previously described.

FIGS. 9 to 12 show an embodiment in which a geneva wheel 35 has only four slots and, if the wheel 35 has the same diameter as the wheel 11 previously described, the distance between the axis 36 of the wheel 35 and the axis 37 of an associated cam wheel 38 is substantially increased. As a result it may be undesirable or impractical to use an outer surface of the cam wheel 38 as a locking surface. The wheel 38 is generally similar to the wheel 30 of FIGS. 5 to 8 having parallel part-cylindrical surfaces 39, 40 corresponding to the surfaces 19, 31. The surfaces 39, 40 are spaced so as to have a slight clearance on rollers 41 on the geneva wheel 35, and the surface 40 is in sprung engagement with two of the rollers 41 in the condition shown in FIG. 9.

A drive roller 42, corresponding to the previously-described rollers 16, is carried by the cam wheel 38 for driving engagement with the wheel 35. The roller 42 is carried by a local projection of the wheel 38. An outer surface 43 of the portion of the wheel 38 which also provides the surface 39 does not have a sufficiently large radius to engage the rollers 41 and in the operating positions shown in FIGS. 9, 10 and 12 locations of the rollers 41 is between the surfaces 39, 40 and the surface 39 plays no part in locating the wheel 35.

In the embodiment shown in FIGS. 9 to 12 a spring loaded bolt 25 and equi-spaced auxiliary rollers 22, as described above, these parts being omitted from the drawings for clarity.

It will be understood that the rollers 17 or 41, and the various co-operating cylindrical surfaces need not be provided on the geneva and cam wheels, but could be provided on separate detent wheels which are coupled to the geneva and cam wheels for rotation therewith.

We claim:

1. A geneva mechanism comprising: a relatively fixed structure, a geneva wheel mounted on said structure for rotation about a first axis, a driving member mounted on said structure for rotation about a second axis and being drivingly engageable with said geneva wheel to impart stepwise rotation thereto, first and second detent means respectively rotatable with said geneva wheel and said driving member, said first detent means comprising a plurality of first abutment surfaces arranged on a pitch circle about the axis of rotation of said geneva wheel, and said second detent means comprising a first part-cylindrical surface which in a first relative position of said first and second detent means simultaneously engages two of said first abutment surfaces to prevent rotation of said first detent means and said geneva wheel, a plurality of second abutments carried by said geneva wheel for rotation therewith, the number of said second abutments being equal to the number of steps required to effect one rotation of the wheel, and a spring biased bolt mounted on said fixed structure and sequentially engageable with said second abutments, said bolt being operable in a first relative position to urge said geneva wheel in one direction of rotation, and said bolt being displaceable against its spring bias by successive ones of said second abutments as a result of rotation of said geneva wheel in said one direction.

2. A geneva mechanism as claimed in claim 1 in which said second detent means comprises two parallel part-cylindrical faces which define respective third and fourth abutment surfaces, said geneva wheel and said driving member being successively rotatable from said first relative position,
- to a second relative position in which one of said detent means is located between two abutment surfaces of the other detent means, said second position coinciding with the beginning of a driving engagement between said geneva wheel and said driving member,
- to a third relative position in which said detent means are not interengaged,
- to a fourth relative position in which said one detent means is located between two abutment surfaces of said other detent means, said fourth position coinciding with an end of said driving engagement,
- to a fifth relative position in which said first part cylindrical surface engages another two of said first abutment surfaces.

3. A geneva mechanism as claimed in claim 2, in which said bolt is successively engageable with one of said third abutments, in each said third relative position, to urge said geneva wheel in said one direction of rotation.

4. A geneva mechanism as claimed in claim 2 or claim 3 in which said second and fourth positions said third and fourth abutment surfaces are located between respective pairs of said first abutment surfaces.

5. A geneva mechanism as claimed in claim 2 or claim 3 in which said second and fourth positions respective ones of said first abutment surfaces are located between said second and third abutment surfaces.

6. A geneva mechanism as claimed in claim 1 or claim 3 in which said first abutment surfaces comprise rollers.

7. A geneva mechanism as claimed in, claim 2 or claim 3 in which said first and second detent means are carried by said geneva wheel and said driving member respectively.

8. A geneva mechanism as claimed in, claim 2 or claim 3 which includes mounting means for causing said simultaneous interengagement between said first part-cylindrical surface and said first abutment surfaces to be accompanied by relative resilient displacement therebetween.

9. A geneva mechanism comprising: a relatively fixed structure, a geneva wheel mounted on said structure for rotation about a first axis, a driving member mounted on said structure for rotation about a second axis and being drivingly engageable with said geneva wheel to impart stepwise rotation thereto, first and second detent means rotatable with said geneva wheel and said driving member respectively, said detent means being inter-engageable in a first relative position of said geneva wheel and said driving member to prevent rotation of said geneva wheel, a plurality of abutments carried by said geneva wheel for rotation therewith, the number of said abutments being equal to the number of steps required to effect one rotation of the wheel, and a spring biased bolt mounted on said fixed structure and sequentially engageable with said abutments, said bolt being operable in a first relative position to urge said geneva wheel in one direction of rotation, and said bolt being displaceable against its spring bias by successive ones of said abutments as a result of rotation of said geneva wheel in said one direction.

10. A geneva mechanism as claimed in claim 9, in which said bolt is successively engageable by said abutments, in relative positions of said geneva wheel and driving member in which said detent means are not interengaged, to urge said geneva wheel in a second direction of rotation.

* * * * *